United States Patent [19]

Berger

[11] Patent Number: 5,589,720
[45] Date of Patent: Dec. 31, 1996

[54] ELECTRIC MOTOR WITH COOLING DEVICE

[75] Inventor: Josef Berger, Vienna, Austria

[73] Assignee: Elin Motoren GmbH, Vienna, Austria

[21] Appl. No.: 397,231

[22] PCT Filed: Sep. 9, 1993

[86] PCT No.: PCT/AT93/00140

§ 371 Date: Apr. 28, 1995

§ 102(e) Date: Apr. 28, 1995

[87] PCT Pub. No.: WO94/06196

PCT Pub. Date: Mar. 17, 1994

[30] Foreign Application Priority Data

Sep. 10, 1992 [AT] Austria ................... 1807/92

[51] Int. Cl.$^6$ ................... H02K 9/00; H02K 1/32
[52] U.S. Cl. ................... 310/61; 31/54
[58] Field of Search ................... 310/54, 52, 67, 310/53, 59, 58, 61, 90

[56] References Cited

U.S. PATENT DOCUMENTS

| | | | |
|---|---|---|---|
| 3,060,335 | 10/1962 | Greenwald | 310/54 |
| 3,729,641 | 4/1973 | Sato et al. | 310/54 |
| 3,733,502 | 5/1973 | Curtis et al. | 310/61 |
| 3,831,046 | 8/1973 | Curtis et al. | 310/54 |
| 3,908,140 | 9/1975 | Fidei et al. | 310/54 |
| 3,916,230 | 10/1975 | Albaric et al. | 310/61 |
| 4,647,805 | 3/1987 | Flygare et al. | 310/61 |

FOREIGN PATENT DOCUMENTS

| | | |
|---|---|---|
| 0231502 | 8/1987 | European Pat. Off. . |
| 1136444 | 5/1957 | France . |
| 1163764 | 9/1958 | France . |
| 3043992 | 7/1982 | Germany . |
| 201408 | 2/1939 | Switzerland . |
| 337267 | 5/1959 | Switzerland . |
| 1236588 | 6/1966 | U.S.S.R. . |
| 1019804 | 2/1966 | United Kingdom . |
| 2099229 | 12/1982 | United Kingdom . |
| WO90/09053 | 8/1990 | WIPO . |

Primary Examiner—Steven L. Stephan
Assistant Examiner—Michael Wallace, Jr.
Attorney, Agent, or Firm—Greenblum & Bernstein P.L.C.

[57] ABSTRACT

In an electric motor the shaft projects beyond the bearing on the closed-end and has a central bore running from this side to close to the drive-end bearing. Centrally in the bore is secured a tube which either extends to close to the end of the bore or is secured in a blind hole in the end of the bore. The tube has a lateral bore in the region of the base of the bore. At the end of the shaft near the closed-end bearing outside the motor housing, a device is secured to the end-plate via which water, used as a coolant, passes into the tube and flows back via the space between the tube and the bore. The tube is held centrally in the bore by two discs, having axial holes, slid over the tube. This construction makes it possible to conduct the heat dissipated in the rotor winding and the rotor, which is transmitted to the shaft, away in the best possible way.

12 Claims, 1 Drawing Sheet

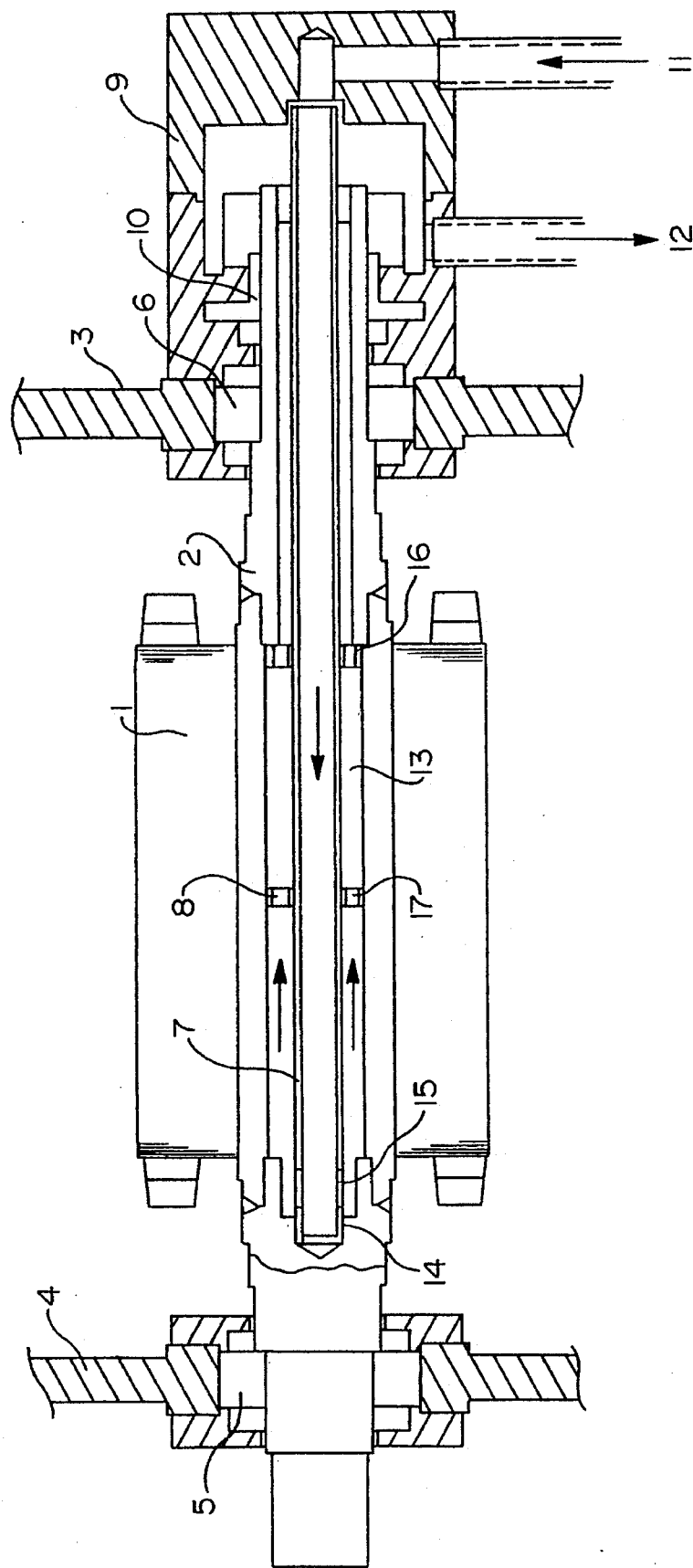

ELECTRIC MOTOR WITH COOLING DEVICE

BACKGROUND OF THE INVENTION

1. Field of the Invention

The present invention is related to an electric machine including a stator, a rotating shaft with a rigidly fixed rotor attached to it, and a frame in which the stator is secured. The frame has an end shield on each side in which one rolling bearing each is secured through which the shaft having a shaft stub is mounted, which protrudes beyond the operating-side bearing. The shaft has a central longitudinally extending bore in which a tube is centrally secured. A device, secured on the end shield at the end of the shaft at the operating-side bearing outside the machine frame, is provided through which a cooling liquid, preferably water, enters the tube and flows back via the space between tube and the bore.

2. Discussion of Background and Material Information

In electric motors waste heat is generated that must be dissipated. Dissipation can be accomplished through fresh air cooling with regard to which a differentiation is made between natural cooling through moving air or radiation without the aid of a fan, induced ventilation through a fan mounted on the rotor or driven by it, and forced-air cooling directly through forced air. The effect of natural cooling and induced ventilation depends upon the speed of rotation of the machine, while forced-air cooling does not depend on the rotation of the machine. In addition, direct water cooling through water flowing in tubes in the frame is also possible, which is also independent of the speed of rotation. Another kind of cooling is circulatory cooling in which the cooling medium, e. g., air, hydrogen, or something similar, flows in circulation through the machine and a water or air cooler. Circulatory cooling can be designed to be dependent on the rotation speed or independent of it.

In United Kingdom Patent Publication No. GB-A-1 019 804 the cooling of the rotor shaft in a high-speed electric machine is described. Here the shaft has a through bore in which a tube is centrally secured. A special part with radial bores to secure the tube in the through bore and to seal off the tube and the through bore on one side is necessary. This part requires a high degree of processing because of the bores. Further, the sealing of this part in the bore when liquid coolant is used is certainly problematic.

In the rotor shaft cooling systems disclosed in International Patent Publication No. WO-A-90/09053 and in French Patent Publication No. FR-A-1 163 764 the shaft also has a through bore that is closed on one side with a part.

SUMMARY OF THE INVENTION

An object of the invention is to dissipate the waste heat arising in the rotor in an optimal fashion.

This object is achieved through the invention, whereby the central longitudinally extending bore in the shaft extends from the operating-side bearing nearly to the drive-side bearing and the tube is secured in a blind hole at the end of the bore, the tube having at least one laterally extending bore in the area of the end of the longitudinal bore. Through this the waste heat present in the rotor winding and in the rotor that is transmitted to the shaft is dissipated in a simple manner. This rotor shaft cooling system is substantially simpler to manufacture than the known types. In addition, no problems need be anticipated with the sealing when liquid coolant is used.

It is advantageous that the tube is secured centrally in the longitudinally extending bore through at least two discs, having axial holes, slid onto the tube with an interval between them. This is a possible and simple way of centering the tube in the bore. The axial holes are needed for the return flow of the cooling liquid.

If there is a small space between the tube and the bore, spars are preferable to the disc, since then the holes in the disc would be too small for the rate of flow.

The device secured to the end member or shield has an inlet and an outlet for the cooling liquid and is sealed from the shaft with an axial face seal. The axial face seal prevents electrically conducting parts of the machine from coming into contact with the cooling liquid, which also prevents damage to the machine.

BRIEF DESCRIPTION OF THE DRAWINGS

The single drawing FIGURE illustrates a section through the electric machine, the stator and the adjacent frame not being portrayed.

DETAILED DESCRIPTION OF THE PREFERRED EMBODIMENTS

The electric machine in accordance with the invention includes, as is generally known, a stator, a rotating shaft 2 with the rotor 1 rigidly secured on it, and a frame in which the stator is secured. The frame has an end member or shield 3, 4, in which one rolling bearing 5, 6 is secured, on each side in which the shaft 2, which has a shaft stub, is mounted.

The shaft 2 extends beyond the operating-side bearing 6 and has a central boring or bore 13 extending longitudinally along the shaft 2 from the operating-side bearing to proximate the drive-side bearing 5. In the bore 13 a tube 7, which is inserted into a blind hole 14 at the end of the bore, is centrally secured. In the area of the end of the bore the tube 7 has a laterally extending bore 15. On the end of the shaft 2 at the operating-side bearing 6 outside the machine frame a device 9 is secured on the end member 3 having passageways through which liquid, such as water, enters the tube 7 and flows back via the space between the tube 7 and bore 13.

The tube 7 is secured co-axially through two discs 8, 16 slipped on the tube with a space between them, the discs having axial holes 17. It can also be held centrally in the bore 13, however, through two spars secured on the tube 7 in two places on the circumference in a longitudinal direction.

The device 9 has an inlet 11 and an outlet 12 for the cooling liquid and is sealed from the shaft 2 with an axial face seal 10.

I claim:

1. An electric motor comprising:
    a rotatable shaft having therewithin a longitudinally extending bore, said shaft having a first end portion and a second end portion;
    a longitudinally extending tube positioned within said longitudinally extending bore of said shaft, a space existing between an exterior of said tube and an interior of said bore, said tube having a first end portion at the first end portion of said shaft and a second end portion at the second end portion of said shaft, said first end portion of said tube having at least one lateral bore for communicating an interior of said tube with said space between the exterior of said tube and the interior of said bore;

a rotor rigidly secured onto said rotatable shaft;

a frame, a stator secured onto said frame, said frame comprising first and second spaced-apart end members, said first end member supporting a drive-side bearing and said second end member supporting an operating-side bearing, said drive-side bearing receiving the first end portion of said shaft and said operating-side bearing receiving the second end portion of said shaft, said second end portion of said shaft having an extension extending beyond said operating-side bearing; and a device, secured onto said second end member of said frame, over said extension of said second end portion of said shaft, having a passageway in communication with the interior of said tube for transferring a cooling fluid through said device into said tube at said second end portion of said shaft, along the interior of said tube, through said lateral bore in said first end portion of said tube, along said space between the exterior of said tube and the interior of said longitudinal bore of said shaft.

2. An electric motor according to claim 1, wherein:

said longitudinal bore of said shaft extends from said operating-side bearing toward and nearly up to said driving-side bearing.

3. An electric motor according to claim 2, wherein:

said first end portion of said tube is secured to said first end portion of said shaft at a blind hole at the end of said longitudinally extending bore of said shaft.

4. An electric motor according to claim 1, further comprising:

means for securing said tube co-axially within said longitudinally extending bore of said shaft, said means comprising at least two spaced-apart discs slid onto said shaft, said discs having axial holes for fluid communication through said discs in said space between the exterior of said tube and the interior of said longitudinal bore of said shaft.

5. An electric motor according to claim 4, wherein:

said device comprising a fluid inlet and a fluid outlet for said cooling fluid and an axial face seal for sealing said shaft from device.

6. An electric motor according to claim 1, further comprising:

means for securing said tube co-axially within said longitudinally extending bore of said shaft, said means comprising at least two spaced-apart spars, each said spar being secured to said tube in at least two positions on the circumference discs in a longitudinal direction.

7. An electric motor according to claim 6, wherein:

said device comprising a fluid inlet and a fluid outlet for said cooling fluid and an axial face seal for sealing said shaft from device.

8. An electric motor according to claim 1, wherein:

said device comprising a fluid inlet and a fluid outlet for said cooling fluid and an axial face seal for sealing said shaft from device.

9. An electric motor according to claim 1, wherein:

said cooling fluid is a liquid.

10. An electric motor according to claim 9, wherein:

said liquid is water.

11. An electric motor according to claim 1, wherein said bore comprises a blind hole laterally extending into said shaft.

12. An electric motor according to claim 1, further comprising at least two fixing discs, each said fixing disc for coaxially fixing said tube within said longitudinally extending bore and for allowing fluid to flow through said space.

* * * * *